United States Patent [19]

Nakamura

[11] Patent Number: 4,617,699

[45] Date of Patent: Oct. 21, 1986

[54] HINGE STRUCTURE FOR A SUN VISOR OR THE LIKE WHICH FEATURES A SINGLE STORAGE POSITION SNAP ACTION FUNCTION

[75] Inventor: Haruo Nakamura, Kanagawa, Japan

[73] Assignees: Nissan Motor Co., Ltd., Yokohama; Kasai Kogyo Co., Ltd., Tokyo, both of Japan

[21] Appl. No.: 388,608

[22] Filed: Jun. 15, 1982

[30] Foreign Application Priority Data

Jun. 19, 1981 [JP] Japan ............... 56-90579[U]

[51] Int. Cl.⁴ .......................................... E05D 11/08
[52] U.S. Cl. ..................................... 16/262; 16/342; 296/97 K
[58] Field of Search ............... 16/231, 232, 258, 259, 16/262, 263, 270, 380, 381, 382, 386, 387, 226, 227, 337, 341, 342; 296/97 K; 403/155, 163, 383

[56] References Cited

U.S. PATENT DOCUMENTS

| | | | |
|---|---|---|---|
| 1,166,551 | 1/1916 | Simmons | 16/342 |
| 2,622,922 | 12/1952 | Schroeder | 16/342 X |
| 3,035,864 | 5/1962 | Davidson | 16/342 X |
| 3,741,616 | 6/1973 | Mahler et al. | 296/97 R X |
| 4,070,054 | 1/1978 | Cziptschirsch | 296/97 K |

FOREIGN PATENT DOCUMENTS

| | | | |
|---|---|---|---|
| 2757973 | 7/1978 | Fed. Rep. of Germany | 296/97 K |
| 3002124 | 7/1981 | Fed. Rep. of Germany | 296/97 H |
| 2469307 | 5/1981 | France | 296/97 K |
| 1354485 | 5/1974 | United Kingdom | 296/97 K |
| 1429644 | 3/1976 | United Kingdom | 296/97 K |
| 1452220 | 10/1976 | United Kingdom | 296/97 K |
| 2061210 | 5/1981 | United Kingdom | 296/97 H |

*Primary Examiner*—Fred Silverberg
*Attorney, Agent, or Firm*—Schwartz, Jeffery, Schwaab, Mack, Blumenthal & Evans

[57] ABSTRACT

A shaft which pivotally supports a sun visor is formed with flat surfaces at longitudinally staggered positions and on opposite sides of the shaft, a spring is attached to the visor proper which has flat portions for engaging the flat surfaces so that a "snap action" is provided only when the visor is rotated into close proximity of a home position wherein the flat portions of the spring clamp down flatly on the flat surfaces. When the visor is rotated away from this home position the distortion of the flat portions of the spring produces a reaction which induces sufficient friction between the shaft and the spring to hold the visor in any given selected position.

4 Claims, 15 Drawing Figures

HINGE STRUCTURE FOR A SUN VISOR OR THE LIKE WHICH FEATURES A SINGLE STORAGE POSITION SNAP ACTION FUNCTION

BACKGROUND OF THE INVENTION

1. Field of the Invention

The present invention relates generally to a sun visor for automotive vehicle and more specifically to an improved hinge structure for same.

2. Description of the Prior Art

In a previously proposed arrangement such as shown in FIGS. 1 and 2 of the drawings, a sun visor 1 has been hingedly mounted on the ceiling 6 of a vehicle cabin via an angled shaft 2 and a springy envelope 3 which engages the surface of the shaft 2. Fixedly connected to the springy envelope 3 is a wire frame 4 on which the padding and cover 5 (shown in phantom) are disposed. In operation this arrangement may be set in any given desired position so as to adequately block out the rays of the sun while not excessively obscuring the driver's view. However, this arrangement, particularly after prolonged use has suffered from the drawback of moving from the selected position under the influence of vehicle vibration and the like. This has been particularly prevalent when the visor is set in a non-use or "storage" position wherein it abuts the ceiling 6 of the vehicle cabin. Hence, the driver and/or passengers of the vehicle have been plagued with the constant need to manually move the visor back to its storage position, sometimes with annoying frequency.

To overcome this problem it has been subsequently proposed to provide a hinge arrangement having a "snap action" which securely holds the visor in either one of two diametrically opposed positions. This arrangement is shown in FIGS. 3, 4 and 5A-5C. As best seen in the exploded view of FIG. 4, this arrangement comprises a shaft 7 having flats 8 formed on either side thereof, an envelope 9 which is adapted to slidably receive the shaft 7 therein and which is disposed about the shaft, and a leaf spring 10 which is adapted to seat on top of the envelope 9 and engage the shaft 7 through apertures 11 formed in either side of the envelope. The leaf spring is secured in place by a clip 12 which fits up around the bottom of the envelope and which includes apertures 13 into which barb-like extensions 14 extending from the leaf spring, engage.

However, this arrangement has suffered from a drawback in that, as will be understood from FIGS. 5A to 5C, as the envelope 9 is rotated about the shaft 7 from a position such as that shown in FIG. 5A to one shown in FIG. 5B, the force of the leaf spring 10 tends, due to the presence of the two flats 8, to automatically force the envelope 9 to continue to rotate until the position illustrated in FIG. 5C is reached. Thus, while the arrangement has served adequately to retain the visor in the storage position without trouble, once the visor is rotated toward the windshield 15 of the vehicle to the degree of entering the range indicated by the arrow "a" in FIG. 3, then irrespective of the operators wish, the visor will snap to a position diametrically opposite that of the storage one. This is of course undesirable as the driver (or passenger) may require an orientation which falls within the aforementioned range but wherein the snap action will tend to be induced.

To solve this, it has been proposed to provide only a single flat 16 on the shaft and a single surface 17 on the leaf spring 18 for engaging the flat (See FIGS. 6A-6C).

Now, while this has provided only a single zone in which a desirable "snap" toward and into the storage position is provided, the arrangement has suffered from very jerky rotation of the visor from the storage position and tended to lack sufficient position maintaining ability. The reason for the jerky rotation is due to the existence of only one flat on the shaft and the resulting "bulging out" of only one side of the leaf spring 18 (as occurs as the envelope is rotated from the position shown in FIG. 6C to that in FIG. 6B. This "one sided bulging" action tends to produce a force which acts about a fulcrum point located in the region of the parallel leg portions 19 of the leaf spring and generates a moment which tends to force the leaf spring to a position eccentric with respect to the envelope. Further, as only one flat is inducing a "bulging" of the leaf spring the resulting force forcing the surface of the leaf spring clip and shaft into friction generating contact is diminished as compared with the dual flat arrangement.

SUMMARY OF THE INVENTION

The present invention features an improved hinge structure for a sun visor or the like, wherein the shaft which pivotally supports the visor is formed with flat surfaces at longitudinally staggered positions and on opposite sides of the shaft, and a spring attached to the visor proper which has flat portions for engaging the flat surfaces. With this arrangement a "snap action" is provided only when the visor is rotated into close proximity of the home or storage position, wherein the flat portions of the spring clamp down flatly on the flat surfaces. When the visor is rotated away from this home position the distortion of the flat portions of the spring produces a reaction which induces sufficient friction between the shaft and the spring to hold the visor in any given selected position.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENT

Figure 1:
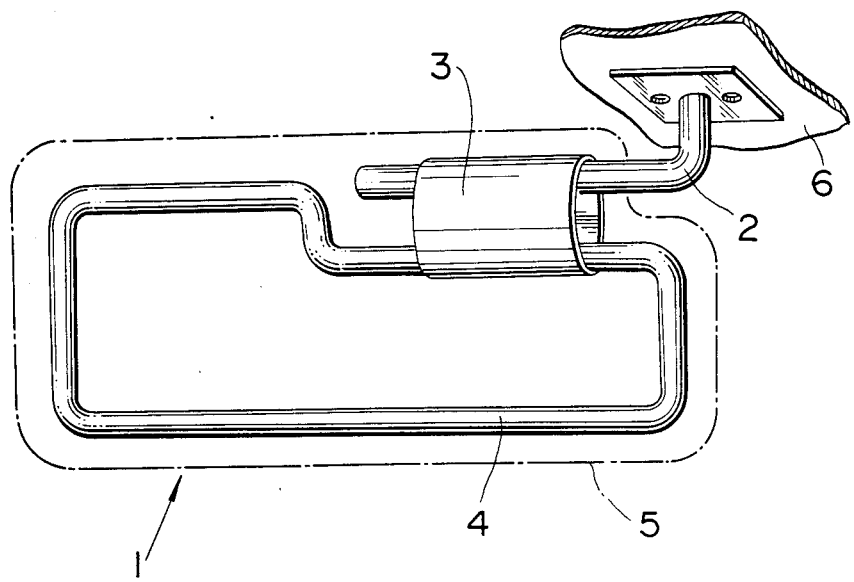
FIG. 1 is a perspective view of a prior art arrangement.
Figure 2:
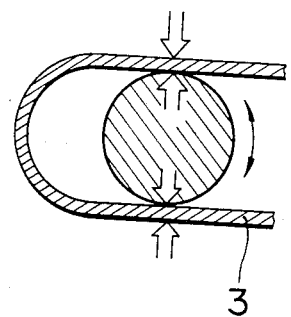
FIG. 2 is a sectional view of a portion of the shaft and envelope shown in FIG. 1.
Figure 3:
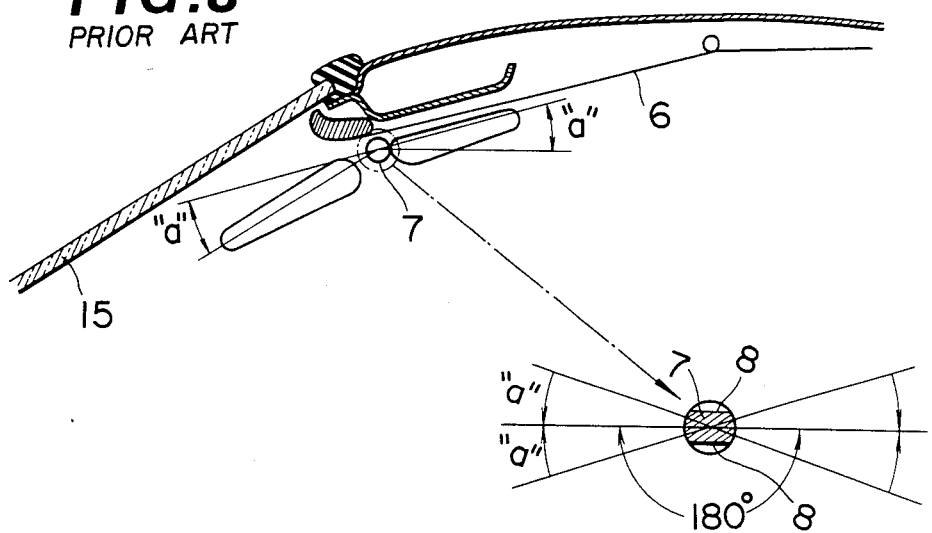
FIG. 3, is a schematic sectional view of a vehicle cabin showing the disposition of a prior art sun visor.
Figure 4:
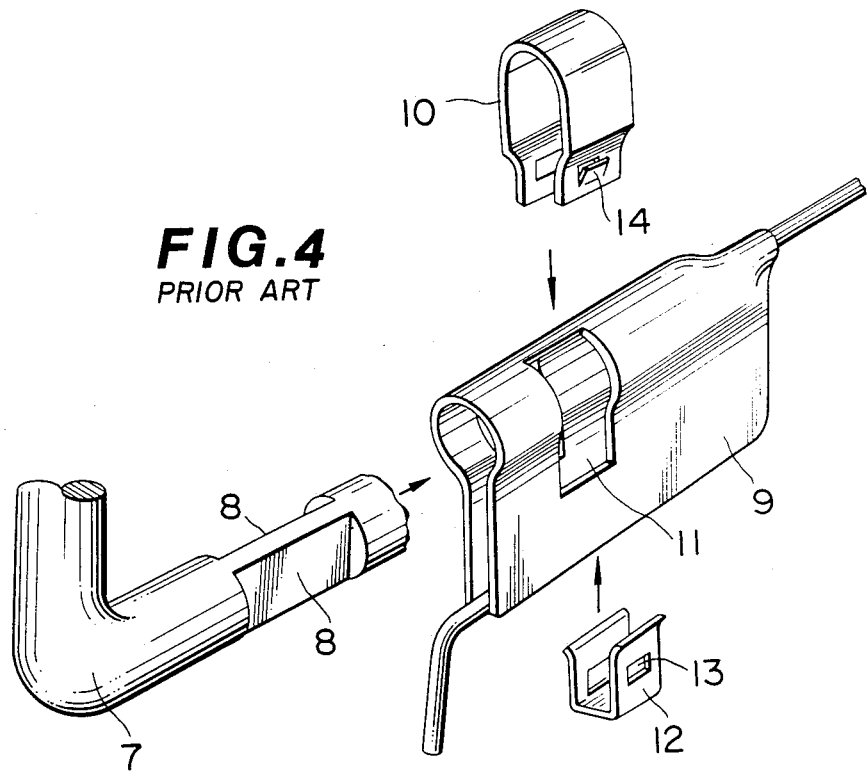
FIG. 4 is an exploded perspective view of a part of the prior art arrangement shown in FIG. 3.
Figure 5A:
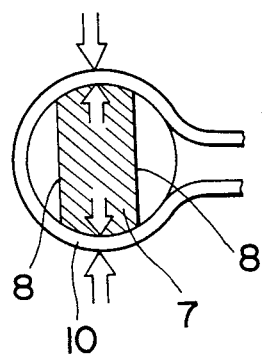
FIGS. 5A to 5C are sectional views showing the snap action produced in the arrangement of FIGS. 3 and 4.
Figure 5B:
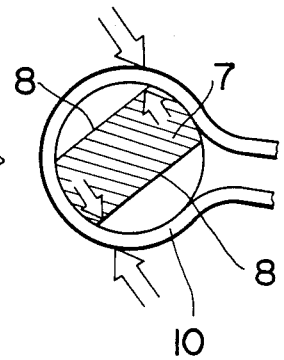
Figure 5C:
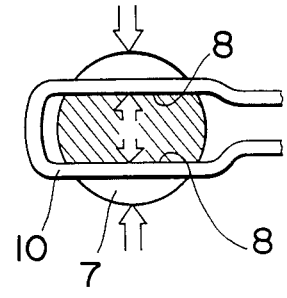
Figure 6A:
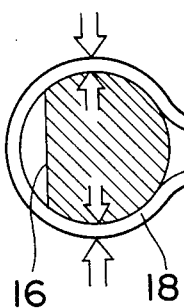
FIGS. 6A to 6C are sectional views showing the snap action produced by the prior art arrangement wherein the shaft is provided with only a single flat.
Figure 6B:
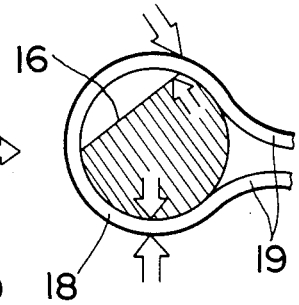
Figure 6C:
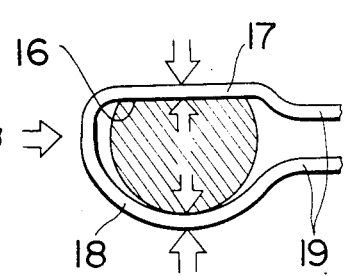
Figure 7:
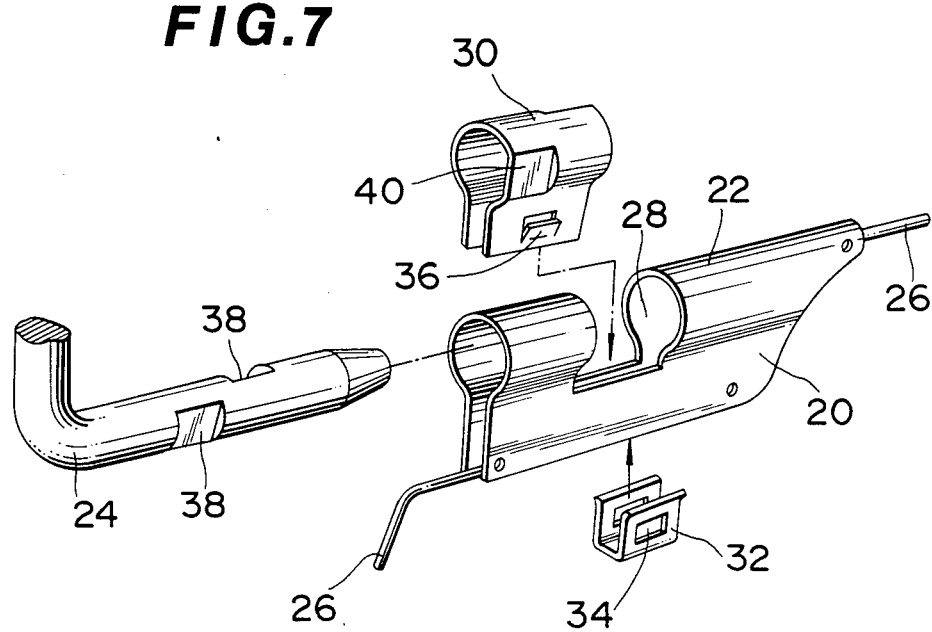
FIG. 7, is an exploded perspective view of a preferred embodiment of the present invention.
Figure 8:
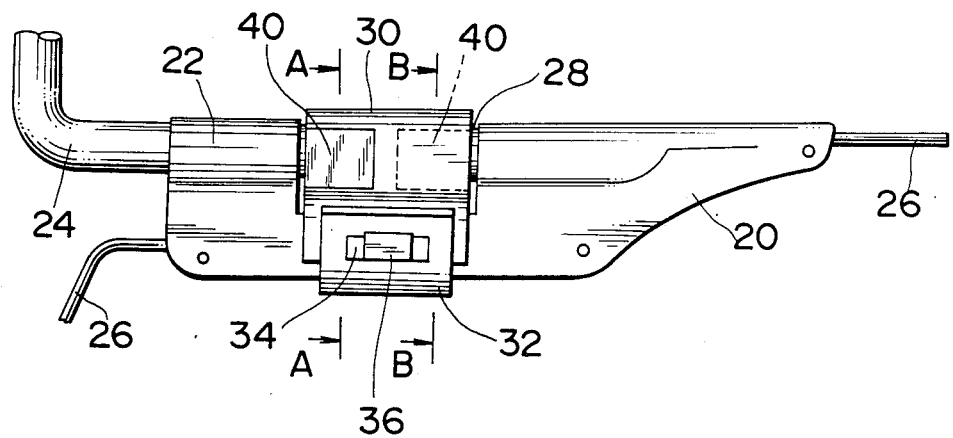
FIG. 8 is an elevation of the arrangement shown in FIG. 7.

Turning now to FIGS. 7 to 10, a preferred embodiment of the present invention is shown. In this arrangement an envelope 20 is formed with an essentially circular cross-section portion 22 adapted to rotatably receive an angled shaft 24 therein. The envelope has a wire frame 26 fixed thereto for mounting a decorative padding and cover (now shown). The envelope 20 is further formed with an aperture 28 into which a leaf spring 30 is inserted. The leaf spring 30 is secured in position on the envelope by a second clip 32 which fits up around the lower edge of the envelope 20 and which is provided with apertures 34 which receive barb-like projections 36 formed on the spring clip.

As shown the shaft 24 is formed with flat surfaces or flats 38 on either side thereof but at staggered positions therealaong. The leaf spring 30 is formed so as to have two flat portions 40 adapted to engage the flats on the shaft.

Figure 9A:
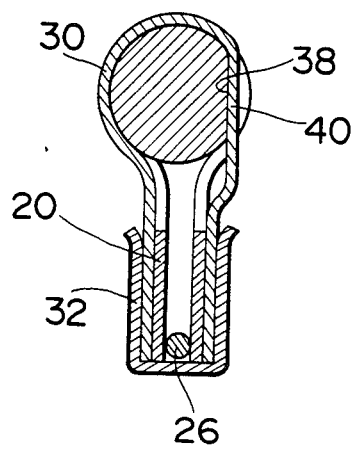
FIGS. 9A and 9B are sections taken along section lines A—A and B—B of FIG. 8 respectively.
Figure 9B:
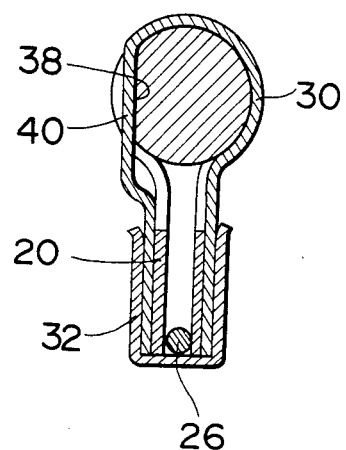
Figure 10:
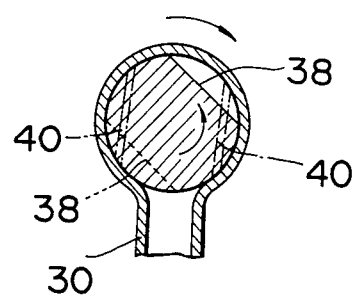
FIG. 10 is a section showing the leaf spring of the preferred embodiment when the visor is rotated to an operative position.

With this arrangement, when the envelope is rotated to a position such as shown in FIGS. 9A and 9B, wherein the flat portions 40 of the leaf spring seat flatly on the flat surfaces 38 of the envelope is held up against the ceiling without fear of unwantedly dropping down to obscure the driver's or passenger's view. However, once the visor is manually moved from the just mentioned home position, the flat portions of the leaf spring are distorted or "bulged out" from the positions indicated in phantom in FIG. 10, and as both of the flat surfaces are distorted, a reaction is produced which biases the cylindrical surfaces of the shaft against the inner periphery of the leaf spring and as the flat surfaces are staggered along the shaft, the actual surface area of the shaft which is contacted by the distored spring, is increased notably greater than the prior art, whereby the amount of friction which resists rotation of the spring (and therefore the envelope) about the shaft is increased markedly.

It will be appreciated from FIGS. 9A and 9B that the envelope may be rotated through 360 degrees before the flat portions of the leaf spring will re-engage with their respective flat surfaces and thus no "snap action" occurs other than into the home position of the visor (viz., the position illustrated in FIGS. 9A, 9B).

Further, as the shaft is provided with two flat surfaces, the spring clip is "bulged out" on both sides, thus offsetting any tendancy for the clip to produce the shuddering or jerky action encountered with the prior art.

What is claimed is:

1. A hinge, comprising:
   a shaft having a generally circular cross-section;
   a member rotatably supported on said shaft;
   indentations defining first and second flat surfaces on said shaft formed along chords of said circular cross-section, said first and second flat surfaces being formed on said shaft at longitudinally staggered positions and on opposite sides of said shaft; and
   spring means connected to said member for engaging said shaft and for resisting rotation of said member about said shaft, said spring means having resilient first and second flat portions positioned on opposite sides at staggered positions along said spring means for engaging said first and second flat surfaces, respectively, when said member assumes a predetermined angular position with respect to said shaft.

2. A hinge as claimed in claim 1, wherein said member takes the form of an envelope formed which has an essentially circular cross section portion for rotatably receiving said shaft and which has a wire frame fixed thereto.

3. A hinge as claimed in claim 2, wherein said spring means takes the form of a leaf spring which is clipped onto said envelope by a clip.

4. A hinge as claimed in claim 3 wherein said leaf spring is formed with barb-like extensions and said clip is formed with apertures for receiving said barb-like extensions therein.

* * * * *